July 15, 1958   J. P. SPINDLER, JR   2,843,357
ROTARY FLUID HANDLING APPARATUS
Filed May 6, 1955   2 Sheets-Sheet 1
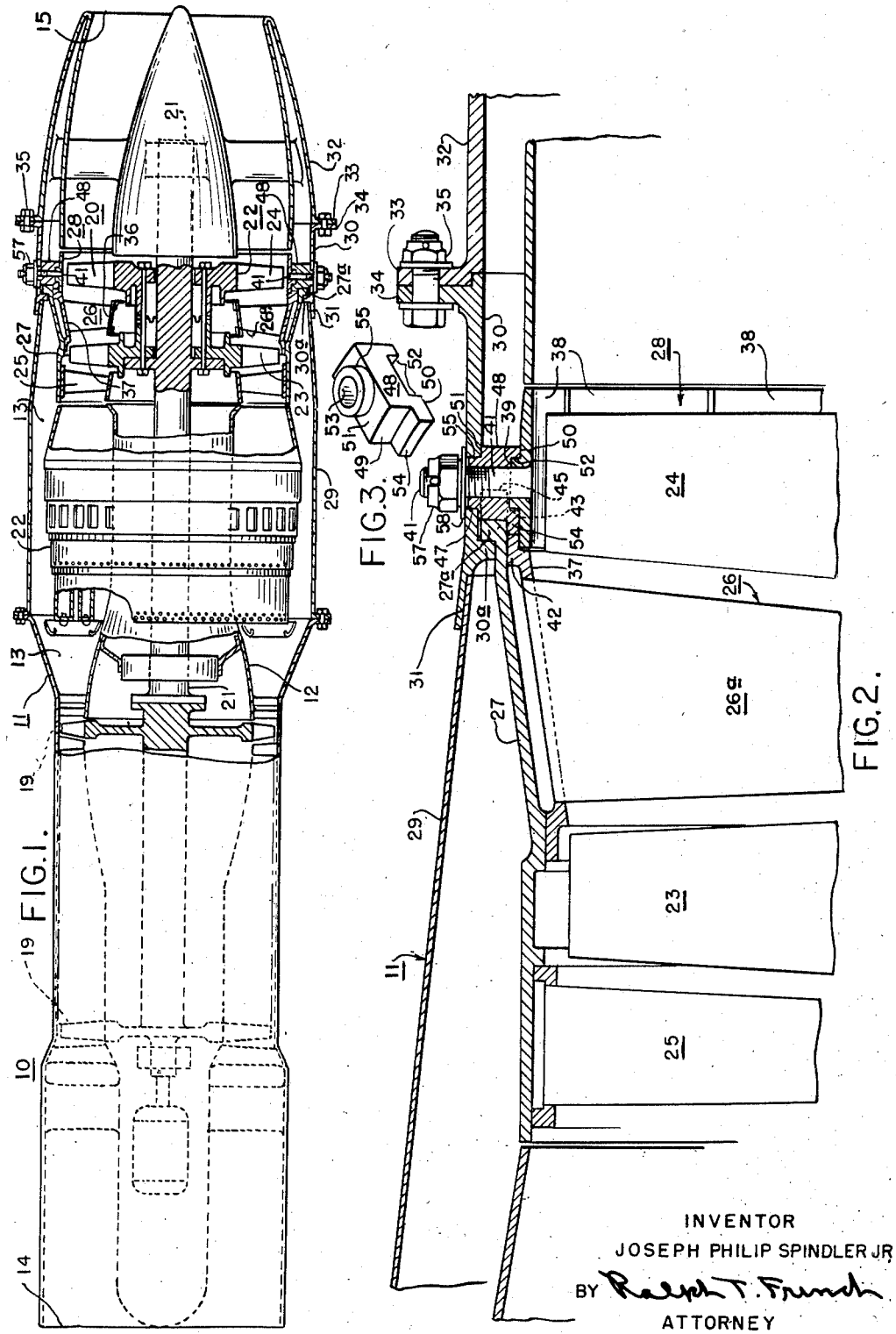
INVENTOR
JOSEPH PHILIP SPINDLER JR
BY Ralph T. French
ATTORNEY

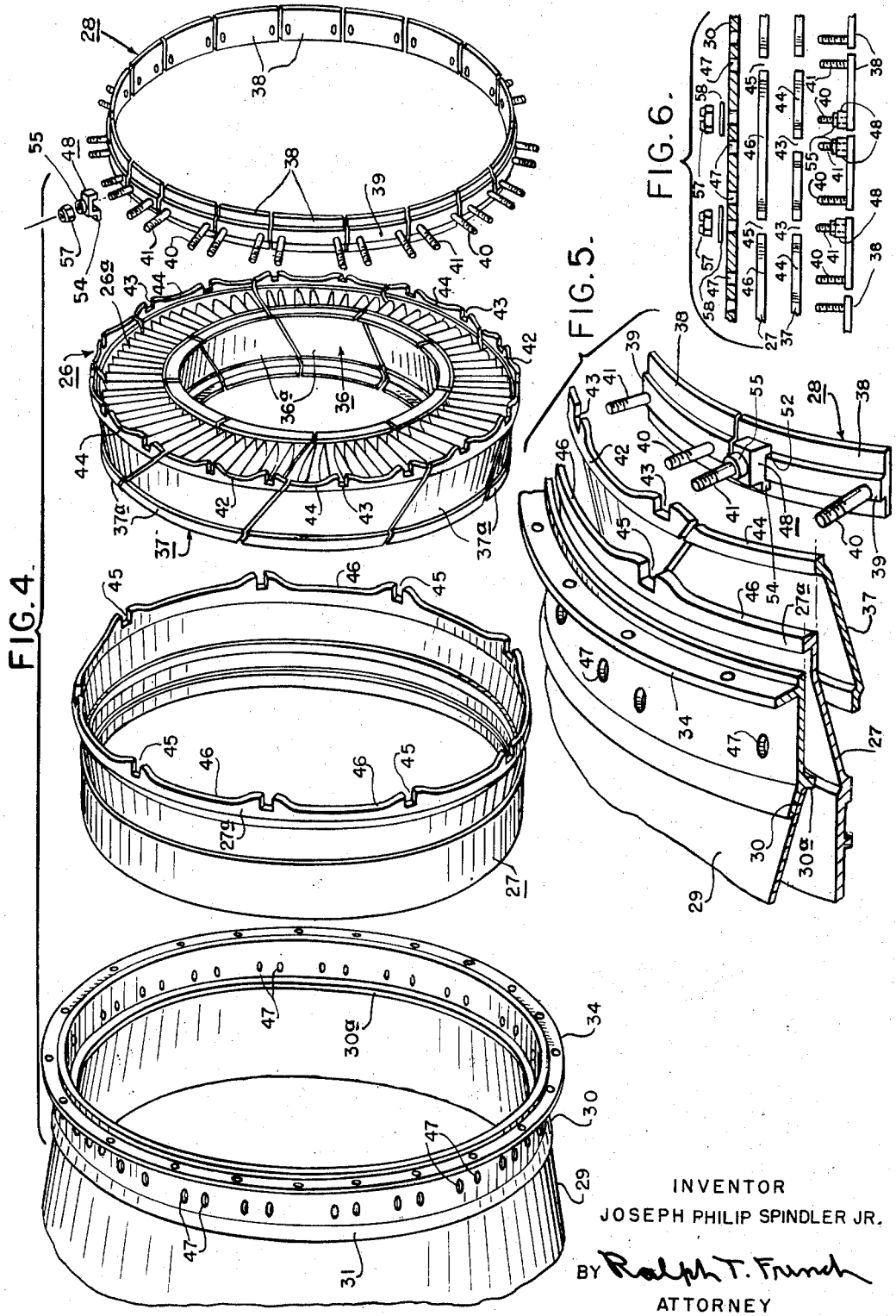

United States Patent Office 2,843,357
Patented July 15, 1958

2,843,357

ROTARY FLUID HANDLING APPARATUS

Joseph Philip Spindler, Jr., Prospect Park, Pa., assignor to Westinghouse Electric Corporation, East Pittsburgh, Pa., a corporation of Pennsylvania Application May 6, 1955, Serial No. 506,679

8 Claims. (Cl. 253—78)

This invention relates to rotary fluid handling apparatus, more particularly to housing structure therefor, and has for an object to provide an improved arrangement for joining a number of tubular members, including a housing member, to each other.

Another object is to provide an arrangement wherein a plurality of concentric tubular members, including an external housing member, are joined to each other by a single row of fastening members, the members being designed and arranged to substantially obviate relative axial movement.

A further object is to provide an arrangement of the above type in which the members are interlocked against relative axial and rotational movement by a single row of threaded fastening members accessible exteriorly of the housing member.

A more specific object is to provide a bushing adapted to cooperate with a plurality of concentric tubular members and to form an interlock therebetween.

These and other objects are effected by the invention as will be apparent from the following desription taken in connection with the accompanying drawings, forming a part of this application, in which:

Fig. 1 is a longitudinal diagrammatic view, partly in section, of a typical aviation gas turbine power plant having the invention incorporated therein;

Fig. 2 is an enlarged fragmentary axial sectional view of a portion of the power plant, showing the invention in detail;

Fig. 3 is a perspective view of one of the bushings;

Fig. 4 is an axially "exploded" perspective view;

Fig. 5 is a substantially radially "exploded" fragmentary perspective view; and

Fig. 6 is a fragmentary schematic developed view, illustrating the cooperation of the major components of the invention.

Referring to Fig. 1 of the drawings, a typical gas turbine power plant 10, with which the invention is adapted to be practiced, may comprise an outer generally cylindrical casing structure 11 having longitudinally mounted therein a core structure 12, forming an annular passageway generally indicated at 13 which constitutes a fluid flow communication extending through the plant from a forwardly directed air inlet opening 14 to a rearwardly disposed exhaust nozzle 15. The usual operating components of the power plant 10 are arranged in axial alignment therein and include an axial flow compressor 19, a driving turbine 20 connected thereto by means of a shaft 21, and annular combustion apparatus 22, which is imposed in the passageway 13 between the discharge end of the compressor and the inlet of the turbine.

In operation, air entering the inlet opening 14 is pressurized by the compressor 19 and delivered through passageway 13 to the combustion apparatus 22. Fuel supplied to the combustion apparatus by suitable means (not shown) is burned in the stream of air under pressure creating motive gases which are expanded through the turbine 20 and finally discharged to the atmosphere through the nozzle 15, establishing a propulsive thrust.

The turbine 20 is of the two-stage type and is provided with a rotor 22 having two rows of blades 23 and 24 attached thereto in any desirable manner. Cooperating therewith is a stationary nozzle vane assembly 25 and a diaphragm vane assembly 26.

According to the invention, the nozzle assembly 25 and the diaphragm assembly 26 are disposed within a tubular intermediate or turbine housing member 27 which is in registry with the outlet of the combustion apparatus 22 and is attached to the outer housing 11 in a manner subsequently to be described. In addition thereto, a turbine liner member 28 is disposed in encircling relation with the rotor blades 24 and is attached to the outer housing 11 in accordance with the invention.

The outer housing 11 has a tubular sheet metal combustion chamber housing portion 29 to which is attached an annular housing portion 30 of thickened cross section having a lap joint connection 31 therewith and fixed thereto in any desired manner as, for example, by seam welding or spot welding. A tubular rear housing portion 32 having an annular flange 33 cooperating with an annular flange 34 of the housing portion 30 is attached thereto by means of a series of bolts and nuts 35 or other suitable means. The outer housing portion 30 has an inwardly directed annular flange 30a which lies in lapping engagement with an outwardly extending annular flange 27a of the turbine housing 27.

The diaphragm vane assembly 26 is a unitary structure provided with a plurality of stationary vanes 26a held together by inner and outer shroud members 36 and 37, respectively. The shroud members 36 and 37 may be integral annular members, if desired, however, they have been shown as composed of arcuate segments 36a and 37a, respectively.

The turbine liner member 28 is preferably formed by a plurality of arcuate segments 38 which cooperate with each other to form a complete annulus when assembled. Each of the liner segments 38 has an outer raised rib 39 in which are received a pair of threaded studs 40 and 41 extending radially outwardly.

The outer shroud 37 is provided with a peripheral flange 42 having a series of spaced notches 43, which as best shown in Fig. 6, align with the studs 41. Also, the flange material between the notches 43 is cut away at 44 to provide clearance for the studs 40.

In a similar manner, the turbine housing flange is provided with a series of notches 45 spaced in a manner to align with alternate studs 41 and the flange material between the notches 45 is cut away as indicated at 46 to provide clearance for the remaining studs 41 and the studs 40.

The outer housing 30 is provided with a series of circular apertures 47 spaced in a manner to align with all of the studs 40 and 41.

As best shown in Fig. 2, the turbine housing 27 and the outer diaphragm shroud member 37 are joined to the outer housing 30 by a plurality of block bushings 48 supported on the segmental turbine liner 28. Since the bushings 48 are substantially identical, only one has been shown in detail and need be described. The bushing 48, as shown in Figs. 2 and 3, is provided with a main body portion 49 having inner and outer arcuate faces 50 and 51, respectively, conforming to the inner and outer faces of the outer housing 30 and the segmental turbine liner 28, respectively. The inner face has a recess 52 formed therein disposed in registry with a bore 53 extending through the bushing and having its axis disposed normal to the chords of the inner and outer bushing faces 50 and 51, respectively. In addition thereto, a projecting arcuate flange or shoulder 54 is provided on the bushing, and a raised circular boss portion 55 extends radially outwardly from the outer bushing face 51.

Referring to Fig. 2 and the schematic development shown in Fig. 6, it will now be seen that upon assembly the end portion of the turbine housing 27 is interposed between the diaphragm shroud 37 and the outer housing 30 and that the flange 27a is in lapping engagement with the outer housing flange 30a. In addition thereto, the shroud flange is interposed between the turbine liner segments and the turbine housing. Each of the studs 40 and 41 is provided with one of the bushings 48 which is seated on the associated liner segment 38 with its recess 52 in keyed engagement with the rib 39.

The flanges 54 of all of the bushings 48 are disposed in lapping engagement with the turbine housing flange 27. However, the bushings may be divided into three groups with regard to keying registry with the shroud flange notches 43 and the turbine housing flange notches 45 and non-keying registry with the clearance portions 44 and 46. The sequence, as best shown in Fig. 6, is as follows. The bushings 48 received on alternate studs 41 are received in the notches 43 and 45, thereby preventing relative rotation between the diaphragm 26 and the turbine housing 27. The bushings received on the remaining studs 41 are only received in the remaining notches 43 and extend past the clearance portions 46. The bushings received on the studs 40 extend past the clearance portions 44 and 46. All of the bushings have their boss portions 55 received in the outer housing apertures 47, thereby interlocking the diaphragm and turbine housing to the outer housing and preventing relative rotational as well as axial movement. The interlock is completed by a plurality of nuts and lockwashers 57 and 58, respectively, applied to the studs 40 and 41, whereby the turbine liner segments 38 are individually drawn radially outwardly together with the bushings 48 to apply following clamping forces on the shroud flange 42 and the turbine housing flange 27a.

From the foregoing, it will be seen that the invention provides a simple and positive arrangement for interlocking several concentric tubular members or housings to an outer housing without the need for locking the members to each other by separate fastening means. It will further be seen that the members are interlocked in such a manner that axial and turning motion between the members is obviated.

Although the turbine housing 27 and the diaphragm shroud 37 have been illustrated as provided with notches for receiving only some of the bushings 48, it must be pointed out that the turbine housing and the shroud may, if desired, be provided with more or less notches so that all of the bushings or fewer of the bushings may be received therein. However, it has been found that from a production standpoint, the turbine housing and the shroud need not be interlocked to the bushings at every instance and that the interlock attained is adequate to maintain the parts in position under the operating forces acting thereon. Also, by utilizing fewer notches, the matters of alignment of the notches to the bushings, maintaining dimensions between notches on each part and maintaining tolerances between one part and another are greatly simplified so that variations in the manufactured components are not critical. Furthermore, the various components may be assembled to each other with greater ease.

While the invention has been shown in but one form, it will be obvious to those skilled in the art that it is not so limited, but is susceptible of various changes and modifications without departing from the spirit thereof.

What is claimed is:

1. In a rotary fluid machine having a tubular outer housing, a tubular inner housing and an annular inner member, means for joining said housings and said inner member together including an annular series of spaced bushings interposed between said inner member and said outer housing, each of said bushings having a flange, said inner housing being interposed between said flange and said outer housing, and means for clamping said inner member and said bushings to said outer housing and for clamping said inner housing between said bushing flange and said outer housing, said means including a plurality of threaded members extending from said inner member through said bushings and said outer housing.

2. The structure recited in claim 1 in which the outer and inner housings are provided with mutually overlapping peripheral flanges, the inner housing flange being disposed between the outer housing flange and the bushing flanges.

3. The structure recited in claim 2 in which the inner member is formed of a plurality of arcuate segments and each of said segments is provided with at least one of the threaded members.

4. In a rotary fluid machine having a bladed rotor, a stationary vane assembly disposed in axial alignment with said rotor and a tubular outer housing encompassing said rotor and said vane assembly, the combination comprising an annular shroud member connected to said vanes, a plurality of arcuate segments forming an annular liner encompassing said rotor, means for joining said outer housing, said shroud member and said liner together including an annular series of spaced bushings interposed between each of said liner segments and said outer housing, each of said bushings having a main body portion and a recess in the innermost face of said body portion, each of said liner segments having an annular rib received in said recess, said shroud having a peripheral marginal portion disposed in overlapping engagement with said liner, an annular, radially extending flange provided on one of said shroud and said outer housing for maintaining said shroud and said outer housing in predetermined relation to each other, and a plurality of threaded clamping members extending from said liner segments through said bushings and said outer housing.

5. The structure recited in claim 4 in which the shroud member is encompassed by a tubular inner housing member having a flanged marginal portion confined between the first mentioned flange and the bushings, said bushings having axially extending shoulders for clamping said inner housing to said outer housing.

6. The structure recited in claim 5 in which the shroud member and the flanged marginal portion of the inner housing member are provided with a series of notches, the bushings being partially received in and extending through said notches, whereby said shroud member, said inner housing and said liner segments are restrained against rotation relative to each other and to said outer housing.

7. A bushing for joining more than two concentric tubular members in a manner to restrain the same against relative movement, said bushing having a main body portion provided with outer and inner arcuate faces, said inner face having a recess formed therein, said main body having a bore extending therethrough substantially normal to the chord of said arcuate faces and an arcuate flange projecting therefrom transversely to the axis of said bore.

8. The structure recited in claim 7 in which the recess is elongated, the recess, the inner and outer arcuate faces and the arcuate flange are concentric with each other, and the outer face is provided with a raised boss portion, the bore extending from the recess through the boss portion.

References Cited in the file of this patent

UNITED STATES PATENTS

| 1,754,426 | Hodgkinson | Apr. 15, 1930 |
| 2,427,244 | Warner | Sept. 9, 1947 |
| 2,510,606 | Price | June 6, 1950 |

FOREIGN PATENTS

| 486,340 | Great Britain | June 2, 1939 |